(12) United States Patent
Pierau et al.

(10) Patent No.: US 12,503,374 B2
(45) Date of Patent: Dec. 23, 2025

(54) RECYCLING OF COMPONENTS CONTAINED IN A RESIDUE OBTAINED FROM THE CHLORIDE PROCESS

(71) Applicant: Kronos International, Inc., Leverkusen (DE)

(72) Inventors: Thomas Pierau, Leverkusen (DE); Frank Landwehr, Gladbeck (DE); Mitja Medved, Leverkusen (DE)

(73) Assignee: Kronos International, Inc., Leverkusen (DE)

( * ) Notice: Subject to any disclaimer, the term of this patent is extended or adjusted under 35 U.S.C. 154(b) by 174 days.

(21) Appl. No.: 18/213,397

(22) Filed: Jun. 23, 2023

(65) Prior Publication Data

US 2023/0416107 A1 Dec. 28, 2023

(30) Foreign Application Priority Data

Jun. 24, 2022 (EP) .................................... 22180871

(51) Int. Cl.

| | | |
|---|---|---|
| *C01G 23/047* | (2006.01) | |
| *C01F 17/10* | (2020.01) | |
| *C01F 17/212* | (2020.01) | |
| *C01G 33/00* | (2006.01) | |
| *C01G 37/02* | (2006.01) | |
| *C01G 45/02* | (2025.01) | |
| *C01G 53/04* | (2025.01) | |
| *C10L 5/48* | (2006.01) | |

(52) U.S. Cl.
CPC .......... *C01G 23/0475* (2013.01); *C01F 17/10* (2020.01); *C01F 17/212* (2020.01); *C01G 33/00* (2013.01); *C01G 37/02* (2013.01); *C01G 45/02* (2013.01); *C01G 53/04* (2013.01); *C10L 5/48* (2013.01)

(58) Field of Classification Search
CPC .......................... C01G 23/022; C01G 23/024; C01G 23/0475; C01G 23/07; C01G 33/00; C01G 37/02; C01G 45/02; C01G 53/04; C01F 17/10; C01F 17/212; C10L 5/48

See application file for complete search history.

(56) References Cited

U.S. PATENT DOCUMENTS

2009/0148364 A1* 6/2009 Frahm ..................... C22B 7/006
423/74

FOREIGN PATENT DOCUMENTS

| JP | 2017206721 A | * | 11/2017 |
|---|---|---|---|
| JP | 6727918 B2 | | 7/2020 |
| WO | 2009071284 A1 | | 6/2009 |

OTHER PUBLICATIONS

Extended European Search Report issued by Examiner Alessandra Marucci, of the European Patent Office, dated Jan. 2, 2023, in corresponding European Patent Application No. 22180871.0.

* cited by examiner

*Primary Examiner* — Latosha Hines

(74) *Attorney, Agent, or Firm* — Troutman Pepper Locke LLP; Mark R. Backofen

(57) ABSTRACT

The invention relates to a method for treating a residue obtained from the chloride process, wherein the residue comprises the components titanium dioxide, coke, an inert metal oxide, and an iron-containing component. Further, the invention refers to the use of this method to separate the components contained in said residue, and to the use of the separated components in the chloride process for obtaining titanium dioxide.

18 Claims, No Drawings

RECYCLING OF COMPONENTS CONTAINED IN A RESIDUE OBTAINED FROM THE CHLORIDE PROCESS

RELATED APPLICATION

This application claims the benefit of European Application No. 22180871 filed Jun. 24, 2022.

BACKGROUND

Field of the Invention

The invention relates to a method for treating a residue obtained from the chloride process, wherein the residue comprises the components titanium dioxide, coke, an inert metal oxide, and an iron-containing component. Further, the invention refers to the use of this method to separate the components contained in said residue, and to the use of the separated components in the chloride process for obtaining titanium dioxide or as fuel.

Technological Background of the Invention

Titanium dioxide is either manufactured by the well-established sulfate process or the chloride process. The latter uses a titanium-containing feedstock such as titanium-containing slags in a carbochlorination process in which said feedstock is reacted with chlorine in the presence of coke such as petroleum coke in a fluidized bed in a carbochlorination reactor at a temperature of more than 1,000° C. Aside from the desired titanium tetrachloride, other volatile chlorides of metals and metalloids present in the feedstock are obtained. The chlorides are subsequently separated by resublimation or distillation thereby exploiting their varying boiling points. The titanium tetrachloride is finally transformed to titanium dioxide in a combustion process.

When the titanium tetrachloride and the other chlorides being discharged from the reactor, fine bed material, especially unreacted titanium-containing feedstock, further inert metal oxides, in particular silicon dioxide, essentially in the form of quartz and coke are also entrained. Due to its small particle size and low weight, this fine bed material is unsuitable for being reintroduced into the carbochlorination process, since they are discharged again.

The application WO 2009/071284 A1 treats the fine bed material, referred to as cyclone dust, with the aim to enrich the coke and/or the titanium dioxide portion and to reuse it as feedstock in the chloride process by separating quartz from the other bed material components. To achieve this goal, an aqueous suspension of the bed material is provided, and the quartz is activated by the addition of hydrofluoric acid making the quartz more accessible to flotation agents. Aside from being a highly corrosive acid, hydrofluoric acid is also a powerful contact poison making it dangerous and burdensome to handle. By the chemical nature of quartz and hydrofluoric acid, the latter cannot be easily substituted by any other acid. Omitting the usage of hydrofluoric acid, however, diminishes the quality of the separation of titanium dioxide from the quartz.

Another approach is the sintering of the bed material at an elevated temperature of roughly 1,000° C. This relatively high temperature can be further reduced to roughly 850° C. by the use of sodium-containing compounds such as sodium carbonate which forms an eutectic system with the bed material. As a result, the bed material is agglomerated making it less fine and thus more suitable as feedstock for the chloride process. The sintering approach, however, entails profound energy costs and is conclusively less economically attractive. In addition, the composition of the feedstock cannot be adjusted. Quartz will conclusively be reintroduced into the chloride process which is clearly undesired.

Thus, the fine bed material is usually deposited at a waste material heap together with iron containing material such as iron chloride which is a by-product of the chloride process. Commonly, the fine bed material and the iron-containing material is stored together in these heaps over many years.

In case the titanium-containing feedstock comprises a large portion of fine material, the latter has to be deposited at waste material heaps. This is detrimental to the yield of the chloride process and provokes additional costs for the waste material heaps. Aside from the cost factor, depositing a portion of the feedstock is unsustainable, in particular in times when unstable supply chains and high energy costs result in increased feedstock prices and low product margins.

In general, the production of titanium-containing slags disadvantageously requires high energy input and natural rutile resources are becoming increasingly limited worldwide. The demand for natural rutiles is also increasing continuously due to the attractiveness of the chloride process. The increasing demand leads to a higher prices for these rutiles. Further, titanium sources such as ilmenite are available in higher amounts, but possess a significant amount of iron, which would render the chloride process significantly more expensive for the reasons given above.

Therefore, there is a need in the art for treating residue descending from the chloride process to obtain titanium dioxide, wherein the residue comprises the components titanium dioxide, an inert metal oxide, coke, and an iron-containing component selected from the group consisting of iron (II) oxide, iron (III) oxide, iron (II) hydroxide, iron (III) hydroxide, and iron (III) oxide hydroxide such that the titanium dioxide and/or coke can be reused, for example, in the chloride process or in other process.

SUMMARY OF THE INVENTION

It is the object of the invention to provide a method for treating a residue descending from the chloride process to obtain titanium dioxide, wherein the residue comprises the components titanium dioxide, an inert metal oxide, coke, and an iron-containing component selected from the group consisting of iron (II) oxide, iron (III) oxide, iron (II) hydroxide, iron (III) hydroxide, and iron (III) oxide hydroxide, such that the titanium dioxide and/or the coke can be reused, for example, in the chloride process or in other process.

This object is achieved by the method and the use described herein.

This present invention provides a method for recycling titanium dioxide and coke from the residue comprising bed material discharged during the well-established chloride process to manufacture titanium dioxide, and an iron-containing component. This residue can be found in form of heaps where iron-containing components and bed material are jointly deposited. The preferred embodiment of the method aims at the separation of the iron-containing component from the bed material which is further separated into coke, titanium dioxide, further components such as quartz and metal components of commercial interest. The individual components can further be reused in the chloride process or, alternatively, offered for sale. Furthermore, natural rutiles and expensive, manufactured slags are not the only eligible source as starting material for the chloride process.

Therefore, in a first preferred aspect, the invention relates to a method for treating a residue obtained from the chloride process, wherein the residue comprises the components titanium dioxide, coke, an inert metal oxide, and an iron-containing component selected from the group consisting of iron (II) oxide, iron (III) oxide, iron (II) hydroxide, iron (III) hydroxide, and iron (III) oxide hydroxide, the method comprises the following steps:
 a) providing an aqueous suspension of the residue,
 b) adjusting the pH of the aqueous suspension to a pH value of from about 3 to about 4,
 c) subjecting the aqueous suspension obtained in step b) to a step of deagglomerating the residue to obtain the individual components of the residue,
 d) optionally, separating the coke from the aqueous suspension obtained in step c),
 e) separating the titanium dioxide from the aqueous suspension obtained in step c) or d), and
 f) optionally, separating the iron-containing component from the aqueous suspension obtained in step c), d) or e).

In as second preferred aspect, the invention is directed to the use of the method as described herein which is characterized in that at least one of the group consisting of titanium dioxide, coke, an inert metal oxide, and an iron-containing component, wherein the iron-containing component is selected from the group consisting of iron (II) oxide, iron (III) oxide, iron (II) hydroxide, iron (III) hydroxide, and iron (III) oxide hydroxide is separated from a residue obtained from the chloride process, wherein the residue comprises the components titanium dioxide, coke, an inert metal oxide, and an iron-containing component.

In a further preferred aspect, the invention refers to the use of the titanium dioxide and/or the coke obtained by the method as described herein as a secondary source in the chloride process to obtain titanium dioxide.

In a final preferred aspect, the invention is directed to the use of the coke obtained by the method as described herein as fuel.

Further advantageous embodiments of the invention are stated in the dependent claims.

DESCRIPTION OF THE PREFERRED EMBODIMENTS

These and other aspects, features and advantages of the invention become obvious to the skilled person from the study of the following detailed description and claims. Each feature from one aspect of the invention can be employed in any other aspect of the invention. Numerical ranges stated in the format "from x to y" include the mentioned values and the values that are within the respective measuring accuracy as known to the skilled person. If several preferred numerical ranges are stated in this format, it is a matter of course that all ranges formed by the combination of the various end points are also included. The use of the term "about" is intended to encompass all values that lie within the range of the respective measurement accuracy known to the skilled person.

In a preferred embodiment of the invention, the residue which is used in step a) of the method described herein comprises the components titanium dioxide, coke, an inert metal oxide all of which were part of the bed material discharged during the chloride process applied in the manufacture of titanium dioxide, and an iron-containing component. The inert metal oxide is usually silicon dioxide, in particular quartz. The coke may be any coke usually employed such as petroleum coke or fuel coke. In addition to the bed material, waste material heaps usually comprises an iron-containing component which is a by-product of the chloride process which is usually iron (II) chloride and/or iron (III) chloride. In case said component is deposited in a waste material heap, the component is exposed to weather conditions, in some cases over many years, the iron (II) chloride and the iron (III) chloride are oxidized into their respective hydroxides, oxide hydroxides, and oxides. Thus, in the sense of the present invention, the iron-containing component is selected from the group consisting of iron (II) oxide, iron (III) oxide, iron (II) hydroxide, iron (III) hydroxide, and iron (III) oxide hydroxide and mixtures thereof, preferably iron (II) oxide, iron (III) oxide, and mixture thereof. In addition, the exposure to weather conditions over several years causes the iron-containing component to adhere to the surface of the titanium dioxide, coke and the inert metal oxide commonly in the form of shells thereby forming agglomerates. The agglomerates are bonded strongly together such that they cannot be easily deagglomerated upon simple stirring. In a preferred embodiment of the present invention, the residue used in the method described herein is mined from a waste material heap as described herein. The residue thus comprises the bed material and the iron-containing component which have been exposed to weather conditions as described above. A typical composition of this waste material heap is as follows: from about 5 wt. % to about 10 wt. % titanium dioxide which may originate from slags, ores and the like, from about 8 wt. % to about 12 wt. % coke such as pet coke, from about 13 wt. % to about 16 wt. % silicon dioxide, up to about 3 wt. % metal and metalloid oxides and hydroxides other than iron, and the remainder is iron (II) oxide, iron (III) oxide, iron (II) hydroxide, iron (III) hydroxide, and iron (III) oxide hydroxide. All weight percentages referred to the total amount of the residue. In addition, the residue may further comprise iron (II) chloride and/or iron (III) chloride.

The aqueous suspension in step a) is provided by mixing water with the residue described herein under agitation with elevated temperature, if needed, in a suitable vessel equipped with a stirring device. The concentration of the residue is of between about 100 g/l to about 700 g/l, preferably about 400 g/l. Preferably, the step a) is conducted such that the residue is homogenously suspended in the aqueous suspension.

In the subsequent step b), the pH of the aqueous suspension is adjusted to a pH value of from about 3 to about 4. Preferably, this step is conducted under agitation and/or at elevated temperature, if needed. Usually, an acid is added to the suspension. Any suitable acid may be used in this step, among them, hydrochloric acid, nitric acid and sulfuric acid, preferably hydrochloric acid is used. The afore-mentioned acids can be provided and added in an aqueous form. In case the pH value must be elevated, a base is added such as sodium carbonate, sodium hydroxide, potassium hydroxide, preferably sodium hydroxide. Said bases can be provided and added in an aqueous form. In case specific metals such as chromium, nickel and niobium are present, the dissolved and mobilized ions can be separated, for example, by adsorption or extraction to purify the desired residue components by known means.

Then, in step c), the aqueous suspension obtained in step b) is subjected to a step of deagglomerating the residue in order to obtain the individual components of the residue. It is currently believed that, this step c) causes the removal of the iron-containing component as described herein which adheres to the surface of the titanium dioxide, coke and the inert metal oxide commonly in the form of shells thereby forming agglomerates. In other words, the surface of titanium dioxide, coke and the inert metal oxide is cleaned from the adhered iron-containing component selected from the group consisting of iron (II) oxide, iron (III) oxide, iron (II) hydroxide, iron (III) hydroxide, and iron (III) oxide hydroxide and mixtures thereof. Therefore, a specific energy input of preferably from about 2.5 kWh/m 3 to about 10.0 kWh/m 3, preferably of from about 4.0 kWh/m 3 to about 8.0 kWh/m 3 is applied for a mean residence time of from about 5 min to about 60 min, preferably from about 10 min to about 15 min Notably, the specific energy input applied used for the deagglomeration is less than used for milling or grinding which is typically above about 20 kWh/m 3. Preferably, the deagglomeration in step c) is accomplished by an attrition scrubber, jigger and propeller mixer.

In the subsequent step d), the coke obtained in step c) is separated from the aqueous suspension. Preferably, this step d) is accomplished by density such as sedimentation, employing hydrocyclones or spiral separators and/or particle size separation such as filtration or sieving which are all known in the art.

In step e), the titanium dioxide is separated from the aqueous suspension obtained in step c) or d). The coke can also be separated via flotation which is accomplished by dispersing air into the suspension or using hydrocyclones.

In a further preferred embodiment, the residue comprises further oxides and hydroxides of metals and metalloids such as scandium, nickel, chromium, niobium and manganese. At least one of the afore-mentioned are preferably separated from the residue in step g) due to their economic value.

Preferably, the titanium dioxide and/or the coke obtained in step d) or e) is agglomerated. For example, it can be reused as feedstock for the chloride process. This can be achieved by known techniques and methods such as dry or wet compacting, or wet agglomeration. Suitable binders can be employed such as polymer solution of polyethylene oxide, methyl cellulose, starch, sugar derivates, and surfactants or salt solutions, among them, alkali chlorides such as sodium chloride. Pelletizing discs, pelletizing drums, mixing agglomerates, e.g. ploughshare mixers, Eirich mixers, Cyclomix units or other apparatus familiar to one of ordinary skill can be used as agglomeration equipment. The agglomeration can be accompanied with a sintering treatment in order to achieve particle hardness which might be desired. Preferably, the agglomerated titanium dioxide and coke possess a particle size of about 0.1 mm to about 1.5 mm diameter.

Prior to the agglomeration, the titanium dioxide and/or the coke can be subject to a purification step and a dewatering step, when appropriate.

The separated titanium dioxide and/or coke can be conveyed into the carbochlorination reactor either purely or together with other residue. The iron-containing component separated f) is preferably dewatered and optionally disposed.

Preferably, the step a), b) c), d), e) f) and/or g) are conducted at a temperature of at least about 50° C., preferably of at least about 60° C. A temperature of about 100° C. should not be exceeded.

The method steps described herein are preferably conducted in the following order: a), b), c), d), e) f) and then g).

In another preferred aspect of the invention, the method as described herein is used to separate at least one of the group consisting of titanium dioxide, coke, an inert metal oxide, and an iron containing component from a residue obtained from the chloride process, wherein the residue comprises the components titanium dioxide, coke, an inert metal oxide, and an iron containing component.

In a further preferred aspect of the invention, the titanium dioxide and/or the coke obtained by the method according as described herein are used as a secondary source in the chloride process to obtain titanium dioxide. The obtained coke can be used as fuel, e.g. in the cement industry or for coal fired power stations.

The above descriptions of certain embodiments are made for the purpose of illustration only and are not intended to be limiting in any manner Other alterations and modifications of the invention will likewise become apparent to those of ordinary skill in the art upon reading the present disclosure, and it is intended that the scope of the invention disclosed herein be limited only by the broadest interpretation of the appended claims to which the inventors are legally entitled.

What is claimed is:

1. A method for treating a residue obtained from the chloride process to obtain titanium dioxide, the method comprising:
   a) providing an aqueous suspension of the residue, wherein:
      the residue comprises titanium dioxide, coke, an inert metal oxide, and an iron containing component selected from the group consisting of iron (II) oxide, iron (III) oxide, iron (II) hydroxide, iron (III) hydroxide, iron (III) oxide hydroxide, and mixtures thereof;
      the iron-containing component is adhered to the surface of at least some of the titanium dioxide, coke, and/or the inert metal oxide in the form of shells thereby forming agglomerates; and
      the agglomerates remain present in the aqueous suspension;
   b) adjusting the pH of the aqueous suspension provided in step a) to a pH value of from about 3 to about 4;
   c) subjecting the aqueous suspension obtained in step b) to a step of deagglomerating the agglomerates of the residue to remove the iron-containing component from the surface of the titanium dioxide, coke, and/or the inert metal oxide and obtain the individual components of the residue,
   d) optionally, separating the coke from the aqueous suspension obtained in step c),
   e) separating the titanium dioxide from the aqueous suspension obtained in step c) or d), and
   f) optionally separating the iron-containing component from the aqueous suspension obtained in step c), d) or e).

2. The method of claim 1, wherein step f) is performed and the iron-containing component separated in step f) is further dewatered and optionally disposed.

3. The method of claim 1, further comprising agglomerating at least one of the titanium dioxide separated from the aqueous suspension in step e) or the coke separated from the aqueous suspension in step d).

4. The method of claim 1, wherein the residue is obtained from a waste material heap.

5. The method of claim 1, wherein the residue further comprises iron (II) chloride and/or iron (III) chloride.

6. The method of claim 1, wherein the deagglomeration in step c) is accomplished using an attrition scrubber.

7. The method of claim 1, wherein the deagglomeration in step c) involves the application of a specific energy input of from about 2.5 kWh/m³ to about 10.0 kWh/m³ for a mean residence time of from about 5 to about 60 minutes.

8. The method of claim 7, wherein the specific energy input is of from about 4.0 kWh/m³ to about 8.0 kWh/m³ and is applied for a mean residence time of from about 10 min to about 15 min.

9. The method of claim 1, wherein step d) is performed and the separation in step d) is accomplished by density and/or particle size separation.

10. The method of claim 1, wherein the residue further comprises a component selected from the group consisting of scandium oxides, scandium hydroxides, chromium oxides, chromium hydroxides, nickel oxides, nickel hydroxides, niobium oxides, niobium hydroxides, manganese oxides, manganese hydroxides, and mixtures thereof.

11. The method according to claim 10, further comprising:
  g) separating the component selected from the group consisting of scandium oxides, scandium hydroxides, chromium oxides, chromium hydroxides, nickel oxides, nickel hydroxides, niobium oxides, niobium hydroxides, manganese oxides, manganese hydroxides, and mixtures thereof from the residue.

12. The method of claim 1, wherein at least one of the steps a), b) c), d), e) f) or g) are conducted at a temperature of from about 50° C. to about 100° C.

13. The method of claim 12 wherein at least one of the steps a), b), c), d), e), f), or g) are conducted at a temperature of from about 60° C. to about 100° C.

14. The method of claim 5:
  wherein the deagglomeration in step c) involves the use of an attrition scrubber applying a specific energy input to the aqueous suspension of from about 4.0 kWh/m³ to about 8.0 kWh/m³ for a mean residence time of from about 10 to about 15 minutes; and
  further comprising agglomerating the titanium dioxide separated from the aqueous suspension in step e).

15. The method of claim 1 further comprising the step of using the titanium dioxide separated from the aqueous suspension in step e) as a secondary source of titanium in the chloride process to obtain titanium dioxide.

16. The method of claim 1 wherein step d) is performed and further comprising the step of using the coke separated from the aqueous suspension in step d) as fuel.

17. The method of claim 1, wherein the deagglomeration in step c) is accomplished using a jigger.

18. The method of claim 1, wherein the deagglomeration in step c) is accomplished using a propeller mixer.

* * * * *